March 3, 1959　　　　W. C. RUDD　　　　2,876,323
WELDING BY HIGH FREQUENCY RESISTANCE HEATING
Filed Dec. 21, 1956　　　　　　　　　　　2 Sheets-Sheet 2
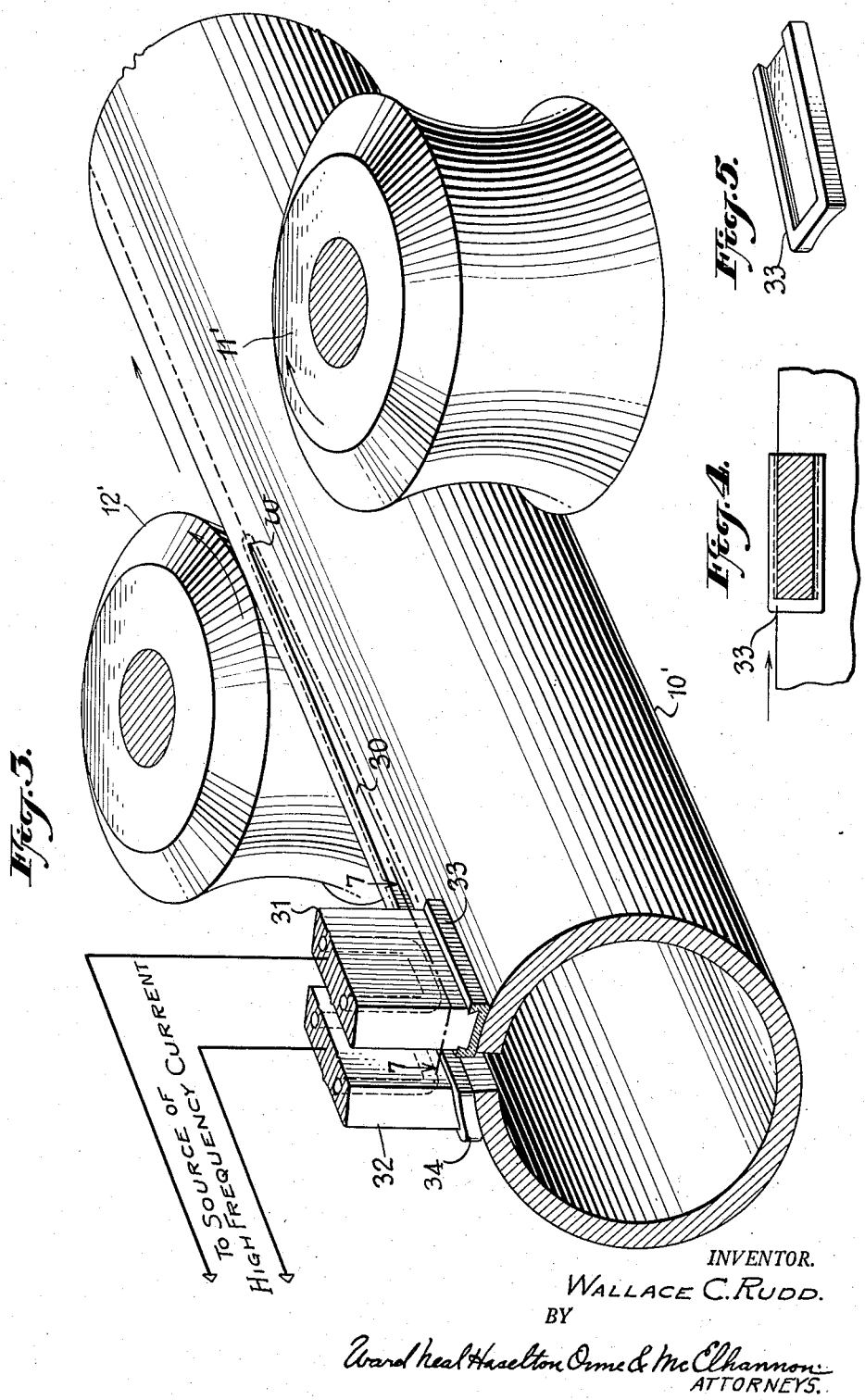
INVENTOR.
WALLACE C. RUDD.

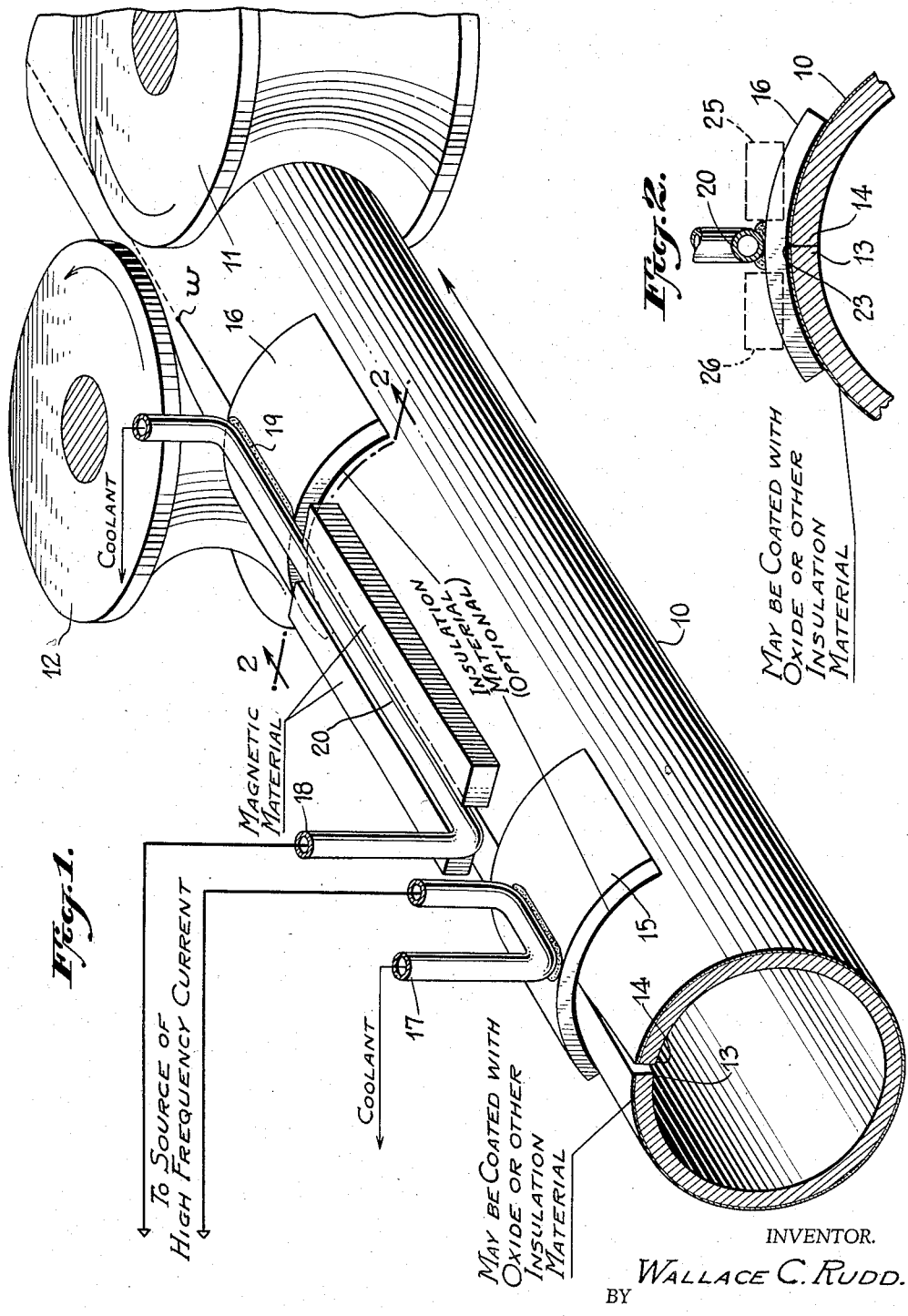

United States Patent Office 2,876,323
Patented Mar. 3, 1959

2,876,323
WELDING BY HIGH FREQUENCY RESISTANCE HEATING

Wallace C. Rudd, Larchmont, N. Y., assignor to Magnetic Heating Corp., New Rochelle, N. Y., a corporation of New York Application December 21, 1956, Serial No. 629,833

9 Claims. (Cl. 219—8.5)

This invention relates to methods and apparatus adapted for the welding of longitudinal seams in metal tubing or seams along which two metal portions such as strips are welded together.

The invention is particularly directed to means and methods for continuously advancing the tubing or metal portions so that edges thereof to be welded together are passed along the line of the desired seam and past a weld point, such edges in advance of the weld point being progressively heated to welding temperature by electrical high frequency current resistance heating, the heating current being capacitatively applied to such edges.

Heretofore, preferred commercial methods for welding such seams have involved either establishing the heating current in the edges to be welded by electromagnetic induction or in other cases by so positioning the edges to be welded that they form a V-shaped gap in advance of the weld point and by applying contacts respectively to opposite sides of such gap in advance of the weld point so that current from a high frequency source connected to said contacts is directly applied to flow thereon along the edges of the V-shaped gap to and from the weld point. Such a method is disclosed in the co-pending application of Wallace C. Rudd and Robert J. Stanton, Serial No. 421,768, filed April 8, 1954 (and in the preceding U. S. application Serial No. 332,422, filed January 21, 1953, and now abandoned, the subject matter of such applications being also disclosed in Belgian Patent No. 530,877, granted August 31, 1954). The present invention more particularly concerns alternatives and improvements for such general methods of high frequency resistance heating.

In some cases, the tubing or the strips to be welded carry on their surfaces an oxide coating having sufficient insulating value due to its character or thickness that if an attempt is made to apply contacts directly thereto, the electrical contacting conditions will be interfered with or be too uncertain or irregular to insure uniform results. For example, aluminum and some other metals will have an oxide coating which, even though quite thin, will generally have a very significant insulating value. And in other cases it may be desired intentionally to have the tubing or the straps coated with insulation prior to welding the seam, which insulation would prevent direct application of current thereto by contacts. Any efforts to scrape away such oxide or insulation coatings just before applying contacts thereto, involve difficulties if uniform conditions are to be assured.

Another difficulty sometimes encountered in using the above-mentioned high frequency resistance heating method on a V-shaped gap resides in the problem of keeping the gap of the required constant dimensions. Furthermore, sometimes the metal to be welded is of a character which will be easily scraped or marred if rapidly advanced past contacts which slidably engage same and while roller contacts may be used, they will engage the metal only at a point or points of tangency and any heavy pressure applied thereto for insuring continuous reliable contact may tend to crush or distort the metal.

In accordance with the present invention, it has been found possible to avoid the above-noted difficulties by maintaining in advance of the weld point and along on the edges to be welded, flows of quite high frequency current and by introducing such current by way of electrodes which have surfaces for capacitatively coupling the source of current to surface areas on the metal tubing or strips. In this way, all direct contact of the electrodes with the actual metal of the tubing or strips may be avoided, preferably by introducing areas of insulation material therebetween, the insulation preferably being such as will have a high dielectric constant to facilitate increase in the transfer of power therethrough.

In accordance with a preferred embodiment of the invention, the electrodes are so arranged and mounted as to permit maintenance of parallel flows of high frequency current along the edges to be welded in advance of the weld point, while such edges are in contact with each other, thus avoiding any gap therebetween with its attendant difficulties.

Various further and more specific objects, features and advantages of the invention will appear from the description given below, taken in connection with the accompanying drawings illustrating by way of example certain preferred forms of the invention.

In the drawings:

Fig. 1 is a perspective view somewhat schematically showing a preferred embodiment of the invention;

Fig. 2 is a broken sectional view taken substantially along line 2—2 of Fig. 1;

Fig. 3 is a perspective view of an alternative embodiment of the invention; and

Figs. 4 and 5 are plan and perspective views of an insulation shoe member which may be used on the electrodes of Fig. 3.

Referring to the drawings in further detail, a length of metal tubing is indicated at 10 as it advances in the direction indicated by the arrow through a tube mill or the like having conventional pressure rollers as at 11, 12 for pressing the opposed longitudinal edges on the tubing together and in firm contact at, or preferably at a considerable distance in advance of, a weld point as indicated at $w$ where such edges are welded together to form the longitudinal seam. It will be understood that while in Figs. 1 and 3 the invention is shown as applied to the problem of welding a longitudinal seam in tubing, yet the invention is equally applicable to the welding together of opposed longitudinal edges of two strips or the like which are being advanced by appropriately shaped rollers and pressed together at the weld point.

In practicing the invention in the manner shown in Fig. 1, the tubing as its advances, has previously been shaped in generally tubular form starting with a continuous strip the edges of which, as indicated at 13 and 14, are brought into opposed relation to form a gap, or preferably before the tube reaches the equipment shown, these edges are brought into actual contact and same remain in contact until they are welded together at the weld point.

Two electrodes are indicated at 15 and 16, the electrode 15 being located at a region substantially in advance of the weld point and the electrode 16 being located generally at a distance of one and one-half to three inches or more closer to, or possibly with portions thereof nearly at the weld point $w$. These electrodes preferably are formed to have considerable areas closely spaced with respect to the metal of the tubing and separated therefrom preferably by suitable insulation material adhered to or otherwise retained on the undersurfaces thereof. All such insulation material, if used, should preferably have a high dielectric constant, for example tetrafluoroethylene, polyethylene, polystyrene or suitable ceramic substances might be used as the insulating material which will afford a great increase of transfer of power from the electrodes to the tubing as compared with the use of air gaps. Also, as above indicated, in some cases the tubing itself may carry on its surfaces oxide films or other insulation having a high dielectric constant which will serve to insulate same effectively from the electrodes. While as shown in Fig. 1, the electrodes 15 and 16 extend for some distance over areas at either side of the line of the desired seam, yet by means hereinafter described, the desired high frequency heating current on the metal of the tubing may be closely concentrated and controlled along the line of the desired seam.

In order that there will be an efficient transfer of current from the electrodes to the tubing, current of a quite high frequency is preferably used, for example, in the neighborhood of 500 kilocycles per second and usually higher, up to for example 10,000 megacycles or more, a preferred normal range being in the magnitude of one megacycle up to 500 megacycles, for example.

As shown, current of these frequency ranges may be connected from the terminals to a high frequency source of known type, one of the terminal connections being indicated at 17 welded or otherwise affixed to the electrode 15 and the other terminal connection being indicated at 18, welded or otherwise affixed as at 19 to the electrode 16. Since with these frequencies, it is necessary to provide cooling means for the connections and electrodes, the terminal connections may be made in the form of hollow tubing as indicated, through which flows of suitable cooling fluid such as water may be passed, the water connections being made of suitable insulation in accordance with known practice in the cooling of high frequency circuit connections.

With the electrodes positioned as shown in Fig. 1 at 15 and 16, even though the gap in the tubing has been previously closed, it will be apparent that parallel flows of high frequency current between these electrodes will be maintained longitudinally of the tubing and parallel to the line of the desired welded seam. In order to cause such flows of current to be concentrated closely along the line of the desired seam, one or the other of the terminal connections from the source of high frequency current is formed with a conductor portion extending along above and in closely spaced relation to the line of the seam. For example, as shown such a conductor portion is indicated at 20, formed integrally with the terminal connection 18 and extending from the electrode 16 back to a point close to electrode 15. At any instant the current in the conductor portion 20 will be flowing in a direction opposite to the current flowing on the metal at the line of the seam, and hence due to the close spacing of the seam line and the conductor 20, by far the lowest impedance path for the high frequency current between the electrodes will be along the line of the seam and thus the current will be concentrated closely along such line and only relatively small amounts of heating current will be wasted by flowing elsewhere on the tube metal. With the high frequencies of the order above mentioned and with a capacitatively coupled electrode as at 15, the conductor portion 20 will also bring about a further important advantage. That is, the portion of the conductor 20 located at the base of the terminal connection 18, will be fairly close to the electrode 15 and because of the very high mutual inductance effect therebetween (the electrode and the conductor portion at any instant carrying currents of opposite polarity) the result will be that the current as it travels through the electrode 15 will be very effectively and closely concentrated at the forward and upper mid-portion of the electrode 15 closest to the connection 18 and thereby automatically in effect the current will be largely capacitatively applied by way of a highly concentrated field in that portion of the dielectric material beneath the electrode which is closest to the edges along which the welded seam is to be formed, thereby avoiding the waste of any substantial amounts of current in portions more remote from the line of the seam.

As explained in the recently filed co-pending application of Wallace C. Rudd and Robert J. Stanton, Serial No. 638,566, filed February 6, 1957, entitled "Seam Welding by High Frequency Resistance Heating," the presence of a conductor located as at 20 above the seam will in some cases in fact, particularly if the tube metal walls are relatively thick, tend to cause the metal along the upper portion of this seam, as indicated at 23 in Fig. 2, to heat more than the metal along the lower portion of such a seam. Thus, as disclosed and claimed in the aforesaid application, bars or strips of magnetic material as at 25 and 26 may be suitably supported in positions extending along in spaced relation to the conductor 20 and also in closely spaced relation to the metal of the tubing, such bars having the effect of increasing the reactance to the current flowing in the metal adjacent thereto and thereby causing the current flows in effect to be crowded closer to the seam and somewhat downwardly therein. By suitably adjusting the positions of these strips of magnetic material by trial with the arrangement of Fig. 1 as well as with the electrodes as in Fig. 3, the current flows along the edges in the seam may be controlled with a sufficient degree of uniformity so that neither the upper or lower portions of the seam will be overheated, unless for some reason it is desired that that be the case.

As disclosed in said recently filed co-pending application, such strips of magnetic material may be formed of sintered magnetic oxide an insulation material, preferably of types now well known per se and which will have a low loss factor and high volume resistivity for example, such as the material marketed under the name Ferramic by General Ceramic & Steatite Corp. It will be understood that other magnetic core material may be used, preferably such that it will have a permeability (mu) greater than 1 (preferably substantially greater) and preferably the magnetic material being of an insulating nature or in finely divided particle form such that any current losses therein will be minimized. For example, finely divided iron carbonyl mixed with a suitable synthetic resinous insulating material may be used.

With the form of the invention shown in Fig. 3, a tube 10' is being advanced in the direction indicated by the arrow between a pair of pressure rollers as at 11', 12', the weld point on the tubing being indicated at $w$ located at the apex of an open V-shaped gap as indicated at 30. Here the two electrodes 31 and 32 connected to the source of high frequency current, are so mounted that their lower metal edges are spaced closely above the opposite edges at the tube gap and each electrode being equipped with insulation shoes as at 33, 34 and formed of materials such as hereinabove mentioned. These shoes, for example, may be shaped in conjunction with the lower ends of the electrodes so that they will be held in place as by dovetail slidable joints.

With this form of the invention, current from one terminal of the high frequency source may at any given instant, for example, pass into electrode 32 and be thence transferred capacitatively to the surface 34 to travel along same to the weld point and back to the surface area at 35 at the opposite side of the V-shaped gap, which is capacitatively associated with the other electrode 31, the latter being in turn connected to the other terminal of the high frequency source. With current of the megacycle frequencies above mentioned, the reactance of current paths in directions around the back of the tubing will be quite high, but the reactance along the gap edges will be quite low, with the result that the current will be concentrated closely along the gap edges. The coupling of the high frequency circuit capacitatively to the tube gap edges as per Fig. 3 has a further important advantage where the current is of frequencies of the order above specified. That is, in order to carry an amount of current affording sufficient power to heat the gap edges to welding temperature, it will generally be desirable that the electrodes be fairly large and also that they be large enough to include cooling fluid cavities as is essential for such frequencies. Thus the electrodes generally will be too large to insert down into the gap to apply the current directly to the edge surfaces in the gap as the gap will necessarily be very narrow at this region shortly in advance of the weld point, but with the capacitative coupling of the electrodes to the tube or strip metal as per this invention, regardless of the size of the electrodes 31 and 32, they may be placed above the exterior surface of the tube metal or strips and the effect will still be to concentrate the current very closely to that portion of the gap edges where it is required, viz. substantially at the gap edges. This results from the fact that the fields of force within the two high dielectric shoes 33 and 34 will be highly concentrated in those portions of the shoes very close to the gap edges, due to the high mutual inductance effect existing with such high frequency fields when close together and of opposite polarities.

With the embodiments of both Figs. 1 and 3, the insulation shoes of high dielectric material obviously need slidably bear only with very light pressure against the tube or strip metal and, being of suitable insulating material contacting with metal, the parts may slide relatively with negligible wear of the dielectric material, thereby avoiding the necessity of replacing the insulation shoes because of wear, except possibly after very long use, and also wholly avoiding any danger of metal-to-metal scarring of the tube or strip edge surfaces. And despite the high degree of concentration of the high frequency fields in certain portions only of the dielectric shoes as above explained, same will be adequately protected from overheating by reason of the fluid-cooled adjacent portions of the metal electrodes. And by filling the space beneath the metal electrodes with high dielectric material, any possibility of a variable air gap is avoided.

As in the case of Fig. 1, if desired, in some cases the insulation shoes may be omitted in which case the electrodes will be spaced from the tube metal by air gaps, or in other cases the tube metal may be coated with an oxide insulation coating or other insulation material in lieu of using the insulation shoes 33, 34.

Generally, however, the embodiment shown in Fig. 1 will be preferred over that shown in Fig. 3, in that with the arrangement of Fig. 1, the areas of capacitative coupling of the electrodes to the tube metal may be made larger and more efficient. Also, with the higher voltages generally more desirable with the form of Fig. 3, there may be some tendency for arcing between the edges of the tubing at the V-shaped gap which have to be quite closely spaced apart. In the embodiment of Fig. 1, even though there may be a quite large voltage drop between the electrodes, they may be readily spaced apart for a distance far enough, for example, from one to three inches, so that there will be no arcing therebetween, especially if the conductor portion 20 is suitably insulated.

The arrangement of Fig. 1 is also well adapted for welding together strips of dissimilar metals, such for example as a high speed steel strip to be welded to a carbon steel strip or a steel strip to a strip of copper. Also, with the arrangement of Fig. 1, if desired, the electrode 15 may be adjusted so as to be in direct contact with the tubing or strips as the case may be, for conductive application of the high frequency current thereto, whereas the electrode 16, which is located where the work has become hot, may be spaced from the work either by an air gap or by insulation as above described. Furthermore, with an arrangement like Fig. 1, if desired, the pressure rollers may be located in advance of the weld point or even in advance of the electrode 16. Under certain conditions, this has the advantage that the work will be subjected to pressure at points where the edges to be welded are still being raised in temperature and assuring that such edges will have no chance of becoming too cool before welding together. It will also be understood that the conductor portion 20 of Fig. 1, instead of being a part of connection 18, might instead be a part of the terminal connection 17 so as to extend forwardly from the electrode 15, thence to the source of high frequency current, instead of extending rearwardly from the electrode 16.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a seam extending along opposed edges of two elongated metal portions, which comprises: advancing said portions while their said edges pass along the line of the desired seam and past a weld point; firmly retaining said edges together as they reach the region of such weld point; maintaining on said edges over a distance substantially in advance of said weld point flows of electrical current of a frequency of about 500 kilocycles per second or higher for progressively heating such edges up to welding temperature at least by the time same reach said point, said current being applied to said edges by electrodes supplied with a current of such high frequency and at least one of which electrodes is spaced a short distance from the metal of the portion or portions to which it applies such current, an area of a solid insulating material having a high dielectric constant filling the intervening space, whereby such electrode is effectively capacitatively coupled to the metal portion or portions; and concentrating the field in the part of such dielectric closest to the line of the desired seam by maintaining another portion of the circuit of such current in close proximity to such part.

2. Method for welding a seam extending along opposed edges of two elongated metal portions, which comprises: advancing said portions with their said edges passing along the line of the desired seam and past a weld point; firmly retaining said edges together as they reach the region of such weld point; and maintaining on said edges over a distance substantially in advance of said weld point, flows of electrical current of a frequency of about 500 kilocycles per second or higher for progressively heating such edges up to welding temperature at least by the time same reach said point, said current being applied to said edges by electrodes supplied with a current of such frequency, one of which electrodes is capacitatively coupled to a surface area located on said metal portions at a region substantially in advance of said weld point and another of which electrodes is capacitatively coupled to a surface area adjacent the region of the weld point, such capacitative coupling being effected by slightly spacing the electrodes from the metal of said portions and by maintaining the intervening spaces filled with insulating material having a high dielectric constant.

3. Method for welding a seam extending along opposed edges of two elongated metal portions which comprises: advancing said portions with their edges approaching with a narrow V-shaped gap therebetween and past a weld point located at or near the apex of such gap; firmly retaining said edges together as they reach such weld point; and capacitatively coupling the terminals respectively of a source of current of a frequency of the order of 500 kilocycles per second or higher, to areas of the metal at said edges and located substantially in advance of the weld point, such coupling being effected by applying to the electrodes insulating shoes having a high dielectric constant and which slidably engage the metal portions, whereby such current is caused to flow from said areas to and from the weld point along the gap edges for progressively heating such edges by resistance heating up to welding temperature by the time same reach said point.

4. Apparatus for welding a seam extending along opposed edges of two elongated metal portions which comprises: means for advancing said portions with their said edges passing along the line of the desired seam and past a weld point, said means including opposed members between which said metal portions are advanced and which act to retain said edges firmly together at least as said edges reach the region of such weld point; a source of electrical current of a frequency of about 500 kilocycles per second or higher; an electrode connected to one terminal of such source, said electrode being positioned whereby a surface area thereof is capacitatively coupled to the surface of said advancing metal portions at a region substantially in advance of said weld point; another electrode connected to the other terminal of said source and also having a surface area positioned to be capacitatively coupled to surface areas of said metal portions closer to the weld point, said current source and said electrodes thus acting to maintain flows of current along on said edges between said electrodes for progressively heating such edges up to welding temperature at least by the time same reach said weld point; and a conductor portion through which said current flows, said conductor portion being positioned to extend along adjacent the line of said seam and closely spaced with respect to said edges and thereby acting to cause said current flows along on said edges to be concentrated closer to said edges.

5. Apparatus for welding a seam extending along opposed edges of two elongated metal portions which comprises: means for advancing said portions with their said edges passing along the line of the desired seam and past a weld point, said means including opposed rollers between which said metal portions are advanced and which act to retain said edges firmly together at least as said edges reach the region of such weld point; a source of electrical current of a frequency of the order of 500 kilocycles per second or higher; an electrode connected to one terminal of such source, said electrode being positioned whereby a surface area thereof is capacitatively coupled to the surface of said advancing metal portions at a region substantially in advance of said weld point; another electrode connected to the other terminal of said source and also having a surface area positioned to be capacitatively coupled to surface areas of said metal portions closer to the weld point, said current source and said electrodes thus acting to maintain flows of current along on said edges between said electrodes for progressively heating such edges up to welding temperature at least by the time same reach said weld point; a conductor portion through which said current flows, said conductor portion being positioned to extend along adjacent the line of said seam and closely spaced with respect to said edges and thereby acting to cause said current flows along on said edges to be concentrated closer to said edges; and strips of magnetic but substantially insulating material having a low loss factor and positioned respectively along the sides of said conductor in spaced relation in respect thereto and in respect to said edges for controlling the distribution of the current flowing on said edges.

6. Apparatus for welding a longitudinal seam in metal tubing which comprises: means for advancing the tubing with the metal edges which are to be welded at the desired seam passing along the line of such seam and past a weld point, said means including opposed rollers between which the tubing is advanced and which act to retain said edges together over a substantial distance in advance of and up to the weld point; a source of electrical current of a frequency of the order of 500 kilocycles per second or higher; an electrode connected to one terminal of such source, said electrode being positioned whereby a surface thereof is capacitatively coupled to the surface of the advancing tubing at a region substantially in advance of said weld point; another electrode connected to the other terminal of said source and also having a surface positioned to be capacitatively coupled to surface areas of the tubing closer to the weld point, said current source and said electrodes thus acting to maintain flows of current along on said edges between said electrodes for progressively heating such edges up to welding temperature at least by the time same reach said weld point; and strips of magnetic but substantially insulating material having a low loss factor and positioned respectively along the sides of said conductor in spaced relation in respect thereto and in respect to said edges for controlling the distribution of the current flowing on said edges.

7. Apparatus for welding a seam extending along opposed edges of two elongated metal portions which comprises: means for advancing said portions with their edges forming a V-shaped gap having an apex substantially at a desired weld point; a source of current of a frequency of about 500 kilocycles per second or higher; and electrodes connected respectively to the terminals of such source, said electrodes being positioned respectively whereby a surface area of each is capacitatively coupled to a surface area on one of said advancing metal portions at a region substantially in advance of said weld point whereby current will be caused to flow along on the metal portions from said areas respectively to and from the weld point for progressively heating the edges up to welding temperature.

8. Apparatus for welding a seam extending along opposed edges of two elongated metal portions which comprises: means for advancing said portions with their said edges passing along the line of the desired seam and past a weld point, said means including opposed rollers between which said metal portions are advanced and which act to retain said edges firmly together at least as said edges reach the region of such weld point; a source of electrical current of a frequency of about 500 kilocycles per second or higher; and a pair of electrodes connected to the terminals respectively of said source, each of said electrodes respectively having surface areas which are capacitatively coupled to surface areas at such spaced locations on said metal portions as to cause flows of current to be maintained on said edges for a substantial distance in advance of the weld point for progressively heating such edges to welding temperature as they approach the weld point.

9. Apparatus for welding a seam extending along opposed edges of two elongated metal portions which comprises: means for advancing said portions with their edges forming a V-shaped gap having an apex substantially at a desired weld point; a source of current of a frequency of about 500 kilocycles per second or higher; electrodes connected respectively to the terminals of such source, said electrodes being formed with fluid-cooling cavities and having insulation shoes of material having a high dielectric constant; and means for supporting the electrodes in position for such shoes slidably to engage said metal portions respectively at opposite sides of said gap, whereby the electrodes are capacitatively coupled respectively to the metal portions to permit current to flow on the metal portions from said shoes respectively to and from the weld point for progressively heating the edges up to welding temperature at the weld point.

References Cited in the file of this patent
UNITED STATES PATENTS

| | | |
|---|---|---|
| 1,954,678 | Meissner | Apr. 10, 1934 |
| 2,672,544 | Finchelstein et al. | Mar. 16, 1954 |
| 2,761,939 | Finchelstein et al. | Sept. 4, 1956 |
| 2,762,892 | Park | Sept. 4, 1956 |
| 2,794,108 | Park | May 28, 1957 |